(12) United States Patent
Gottlieb et al.

(10) Patent No.: US 6,776,263 B2
(45) Date of Patent: Aug. 17, 2004

(54) ELEVATOR SYSTEM FOR THE VERTICAL TRANSPORT OF LOADS IN AN AIRCRAFT

(75) Inventors: Stephan Gottlieb, Herdecke (DE); Joachim Schmidt, Tornesch (DE); Adolf Schreger, Pinneberg (DE)

(73) Assignee: ESW-Extel Systems Wedel Gesellschaft fuer Austruestung mbH, Wedel (DE)

( * ) Notice: Subject to any disclaimer, the term of this patent is extended or adjusted under 35 U.S.C. 154(b) by 143 days.

(21) Appl. No.: 10/235,087

(22) Filed: Sep. 4, 2002

(65) Prior Publication Data

US 2003/0057031 A1 Mar. 27, 2003

Related U.S. Application Data

(63) Continuation-in-part of application No. 09/860,347, filed on May 17, 2001, now abandoned.

(51) Int. Cl.$^7$ .................................................. B66B 11/04
(52) U.S. Cl. ..................... 187/251; 187/288; 187/255
(58) Field of Search .............................. 187/251, 255, 187/256, 257, 288, 394, 287, 276, 270, 236, 238, 401, 402, 403, 254; 244/118.1, 131, 118.2, 118.5, 118.6, 137.1

(56) References Cited

U.S. PATENT DOCUMENTS

| | | | | | |
|---|---|---|---|---|---|
| 3,317,005 | A | * | 5/1967 | Kehoe ......................... | 187/249 |
| 3,517,899 | A | | 6/1970 | Vernon | |
| 3,693,761 | A | * | 9/1972 | Fitzgibbon .................. | 187/411 |
| 4,351,417 | A | * | 9/1982 | Seiz et al. ................... | 187/373 |
| RE32,176 | E | * | 6/1986 | Vernon ...................... | 244/118.5 |
| 4,745,726 | A | * | 5/1988 | Rosenthal et al. ............. | 53/77 |
| 4,923,053 | A | * | 5/1990 | Daniels ....................... | 187/413 |
| 5,125,481 | A | * | 6/1992 | Shibata ....................... | 187/245 |
| 5,413,292 | A | * | 5/1995 | Luria ...................... | 244/118.1 |
| 5,433,293 | A | * | 7/1995 | Sager ......................... | 187/249 |
| 5,469,936 | A | * | 11/1995 | Lauga et al. ................. | 187/205 |
| 5,852,264 | A | | 12/1998 | Muller | |
| 5,904,466 | A | * | 5/1999 | Miller et al. ............. | 414/796.7 |
| 5,921,351 | A | * | 7/1999 | Schroder-Brumloop ..... | 187/255 |
| 6,305,643 | B1 | * | 10/2001 | Sankrithi .................. | 244/118.1 |
| 6,340,136 | B1 | * | 1/2002 | Luria ....................... | 244/118.1 |
| 6,454,208 | B1 | * | 9/2002 | Nervig et al. ............. | 244/118.1 |
| 2002/0148928 | A1 | * | 10/2002 | Oki ......................... | 244/118.1 |

FOREIGN PATENT DOCUMENTS

| | | |
|---|---|---|
| DE | 40 29 628 C1 | 10/1991 |
| DE | 199 56 403 A1 | 6/2001 |
| WO | WO 00/30422 | 6/2000 |

OTHER PUBLICATIONS

*English Abstract of WO 00/30422.
*English Abstract of DE 40 29 628 C1.
*English Abstract of DE 199 56 403 A1.

* cited by examiner

*Primary Examiner*—Jonathan Salata
(74) *Attorney, Agent, or Firm*—Reed Smith LLP

(57) ABSTRACT

The invention is directed to an elevator system for the vertical transport of payloads in an aircraft. The object of the invention, to find a novel possibility for the arrangement of an elevator system for the vertical transport of payloads in an aircraft which permits low-noise, reliably operating conveying between different levels of the aircraft and reliable stopping in the loading and unloading positions and which is characterized by low maintenance and low weight, is met, according to the invention, in an elevator system for aircraft in that the drive system has at least one closed belt for driving and for receiving the load of the elevator cabin, which belt is guided at either end of the mast on deflection rolls and has, between the deflection rolls, at least one freely accessible belt portion oriented parallel to the mast for fastening the elevator cabin and for the movement of the elevator cabin along the mast, wherein the deflection rolls and the belt are provided with teeth which are adapted to one another and the belt is pretensioned in a defined manner, and one of the deflection rolls communicates with a drive motor which has a large torque and can be well regulated, wherein the drive motor, apart from its driving function, is also provided for braking and holding the elevator cabin load.

41 Claims, 9 Drawing Sheets

ELEVATOR SYSTEM FOR THE VERTICAL TRANSPORT OF LOADS IN AN AIRCRAFT

This is a continuation-in-part application of application Ser. No. 09/860,347 filed May 17, 2001, now abandoned which claims foreign priority to German application DE 100 24 973.6 filed May 19, 2000 both of which are hereby incorporated into this specification by reference; and priority is hereby claimed herein to both of these previous applications.

BACKGROUND OF THE INVENTION

The invention is directed to an elevator system for the vertical transport of loads in an aircraft, particularly for the transport of trolleys between the different decks of an airplane.

Elevator systems in aircraft are subject to special requirements with respect to stability, reliability of operation and load retention because of special dynamic stresses during flight (different force effects at take-off and landing or during turbulence). For this reason, certain known elevator principles, e.g., drive sheave with hoist rope and load counterweights, and rope drum wind-up, are ruled out from the outset.

As regards gravitational force and acceleration forces, independent drives are known in different constructions. Among these latter are, for example, hydraulic drives in which the elevator cabin is moved vertically above a hydraulic cylinder comprising multiple members. The heavy weight and substantial space requirement below the elevator cabin are disadvantageous and unacceptable for aircraft.

Further, rack-and-pinion drives have been used as elevator drives. In this type of drive, it is disadvantageous that the drive motor travels along with the cabin as an additional load and that an upward movement and downward movement which is free from play requires extensive adjustment and maintenance.

Spindle drives have been most successful in aircraft because the elevator drive which is free from play can be constructed in a substantially improved manner. In this drive, a vertically arranged spindle is driven in a column, this spindle providing for the upward movement and downward movement and vertical fixing of the cabin by means of a spindle nut communicating with the elevator cabin. The column itself has suitable open strand sections at which the cabin is guided. However, there remain the disadvantages of high maintenance due to lubrication, a relatively substantial noise level and relatively heavy weight of the load-carrying spindle and its bearing.

SUMMARY OF THE INVENTION

The invention teaches a novel possibility for the arrangement of an elevator system for the vertical transport of loads in an aircraft which permits low-noise, reliably operating conveying between different levels of the aircraft and reliable stopping in the loading and unloading positions and which is characterized by low maintenance and low weight. Elevator system for the vertical transport of loads in an aircraft containing an elevator cabin (2), and a mast (1) for carrying and guiding the elevator cabin (2) between different horizontal levels, wherein the elevator cabin is moved and locked in a defined manner by a drive system arranged at the mast, characterized in that the mast (1) has a load-bearing, slender construction of hollow sections (11) and guide rails (13) and a lower mast fastening and upper mast fastening such that the lower mast fastening (15) is mounted so as to move in pendulum fashion around a vertical axis of the aircraft (5) for deliberately transferring all weight forces of the mast (1) to a supporting structure (51) of the aircraft (5), and for receiving all horizontal forces the upper mast fastening (16) connects the mast (1) in longitudinal and transverse axis of the aircraft (5) to a supporting structure (52) of the aircraft (5) located higher such that the mast (1) does not offer any resistance to the movements of the higher supporting structure (52) relative to the lower mast fastening (15), in that a drive system (4) with a drive motor (41) having a high torque and good controllability has at least one closed belt (46) for transferring the torque from the drive motor to the elevator cabin and for transferring load from the elevator cabin (2) to the mast (1), wherein the belt (46) is guided and pretensioned in a defined manner at the lower end and upper end of the mast (1) via a drive roll and a deflection roll (44; 45) and has a toothing adapted to the drive roll and deflection roll (44, 45) and, between the drive roll and deflection roll (44; 45), at least one freely accessible belt portion oriented parallel to the mast (1) for fastening the elevator cabin (2) and its movement along the mast (1).

In an elevator system for the vertical transport of loads in an aircraft containing an elevator cabin and a mast for load carrying and for guiding the elevator cabin between different horizontal levels, the above-stated object is met, according to the invention, in that the mast (1) has a load-bearing, slender construction of hollow sections (11) and guide rails (13) and has a lower mast fastening and upper mast fastening such that the lower mast fastening (15) is mounted so as to move in pendulum fashion around a vertical axis of the aircraft (5) for deliberately transferring all weight forces of the mast (1) to a carrying base structure (51) of the aircraft (5), and for receiving all horizontal forces the upper mast fastening (16) connects the mast (1) in longitudinal and transverse axis of the aircraft (5) to a supporting structure (52) of the aircraft (5) located higher such that the mast (1) does not offer any resistance to the movements of the higher supporting structure (52) relative to the lower mast fastening (15), and in that the drive system has a drive motor (41) having a high torque and good controllability and at least one closed belt for transferring the torque to the elevator cabin and for transferring load from the elevator cabin to the mast, wherein the belt is guided and pretensioned in a defined manner at the lower end and upper end of the mast via a drive roll and a deflection roll (44; 45), a toothing adapted to the drive roll and deflection roll (44, 45) and, between the drive roll and deflection roll, at least one freely accessible belt portion oriented parallel to the mast for fastening the elevator cabin and its movement along the mast.

The toothing of the belt and drive roll and deflection roll advantageously has an additional lateral guide in order to prevent the belt from wandering out of the running surface of the driving and deflection rolls. The belt and the driving and deflection rolls preferably have a spiral toothing or spur toothing with a circulating splined guide.

The belt is advisably formed of a base material of ductile plastic and longitudinally oriented strand inlays. The base material of the belt preferably comprises polyurethane in which steel wires or carbon fibers (carbon strands) are inserted.

The toothing of the belt advantageously has a more wear-resistant layer, preferably polyamide, over the base material at the tooth flanks in order to reduce belt wear.

In order to increase reliability and safety, it has proven advantageous when a plurality of belts are provided as load carrying means for the elevator cabin, wherein the deflection rolls of the belts which are guided next to one another are arranged on a separate shaft at the upper end of the mast and the drive rolls are arranged on a common drive shaft at the lower end of the mast.

A belt monitoring device for monitoring belt tension and detecting belt damage is advisably provided at the upper end of the mast, wherein tearing or a loss in width during load transport causes the drive motor to be shut off and the belt pretensioning can be checked and adjusted during idling.

Vertical oscillations of the elevator cabin are extensively suppressed in that a tensioning device is advantageously provided for the belts and is arranged in an area of the freely accessible belt portion that is concealed by the elevator cabin, so that the belt can be readjusted by applying defined pretensioning.

To simplify the control of the elevator cabin and motor, the drive motor advisably has a measuring device for detecting rotor positions, so that the position of the elevator cabin can be correlated to the rotor position of the drive motor by means of this measuring device via the toothing of the belts. The position of the elevator cabin relative to the floor of a respective deck of the aircraft is accordingly adjustable in a continuous and simple manner preferably by programming a controlling and regulating circuit which is arranged downstream of the measuring device for rotor position detection. For this purpose, the drive motor is advantageously guided at an AC converter which, based on the measurements of the rotor position, regulates the current of the drive motor, determines the exact position of the elevator cabin and moves toward a predetermined position in a deliberate manner.

Because of the requirements for high torque and very good controllability, a brushless DC servo motor which is temperature-monitored in addition for detecting interference and overload is advantageously used as drive motor.

A step-down gear unit is advantageously provided for generating or holding a high torque of the drive shaft required for driving and braking.

A mechanical brake device is advisably provided at the drive shaft to stop the elevator cabin in the currentless state of the drive motor in case of overload or breakdown.

The mast which has the function of supporting and guiding the entire elevator cabin is advantageously formed of hollow sections whose quantity and size are adapted to the quantity and dimensions of the belts. The hollow sections are constructed as channels for the return of the belts. The mast preferably has end modules at the end of the hollow sections for receiving the driving and deflection rolls.

In order that all of the weight forces can be deliberately received by the mast via the lower mast fastening in the supporting structure of the aircraft, the lower mast fastening is advantageously constructed in a lower deck of the aircraft as a pendulum bearing so as to ensure a movability of the mast in the longitudinal axis and transverse axis of the aircraft about this pendulum bearing. On the other hand, for receiving all horizontal forces at a higher deck of the aircraft, the mast is preferably fastened via a sliding pendulum bearing which fixes the mast in the longitudinal axis and transverse axis of the aircraft but does not offer resistance to the movements of the deck relative to one another. For this mast construction, it is advantageous that stiffening or reinforcement is provided only in the region of the lower pendulum bearing in the supporting structure of the aircraft for load suspension of the entire elevator system.

Further, at the sides, i.e., in transverse direction to the side on which the elevator cabin is arranged, the mast advantageously has a section rail or two U-sections located across from one another as guide rails for the movement of the elevator cabin.

For supporting the live load and inherent load of the elevator cabin in the orthogonal plane relative to the longitudinal direction of the mast, a plurality of groups of guide rollers are advantageously provided at the guide rails for guiding the elevator cabin along each side of the mast, which guide rollers roll on different surfaces of the respective guide rail of the mast closely adjacent to one another. The groups of guide rollers preferably contain pairs of rollers, at least two pairs rolling on different rolling surfaces on each guide rail.

The different rolling surfaces of the guide rails on which a pair of rollers rolls are advantageously the (almost concealed) inner sides of the U-section legs in a guide rail with U-section. In case of an individual rail (T-section), the guide rollers would roll in a functionally identical manner on opposite surfaces of one and the same shaped part of the rail.

The guide rollers of a group are advisably arranged at an offset to one another in direction of the guide rail in order to be accommodated in a space-saving manner in a U-shaped guide rail. Otherwise, the guide rollers must be arranged opposite one another orthogonally in pairs. In order to adjust the pairs of guide rollers without play relative to the rolling surfaces of the guide rail, it is advantageous when at least one guide roller of a pair is mounted on a shaft which can be adjusted eccentrically.

For exact guidance of the elevator cabins relative to the mast in each horizontal direction, the guide rollers are preferably constructed in a first variant as two-roller systems, wherein the latter have a non-rotating central part about which the main guide roller revolves and at which a smaller transverse guide roller is embedded on the front side with respect to the main guide roller in such a way that the two-roller system rolls in a defined manner at a side surface as well as at the base (U-section base or rail flange) of the guide rail.

However, in another design variant of the guide rollers, pairs of simple standard rollers can also be associated with the opposite running surfaces of the guide rail and there can be a third, separate transverse guide roller in the immediate vicinity of the pair of rollers.

A slide is advantageously provided between the mast and elevator cabin for coupling the elevator cabin to the freely accessible belt portion and for linear guidance along the mast. The guide rollers for guiding the elevator cabin which engage laterally in the mast are fastened to the slide and there is a mounting surface for the rigid fastening of the elevator cabin.

The slide advisably has the shape of a wide U-section. The mast essentially penetrates inside this U-shaped slide and the shafts of the guide rollers are oriented parallel to the mounting surface of the slide at the inner sides of the legs of the slide, and sections of the guide rails of the mast engage in the oppositely located sections.

The elevator cabin is preferably fastened to the slide by means of a quick-closure to facilitate maintenance and exchange. For this purpose, at least one pin is advisably provided at the slide for load suspension of the elevator cabin and to aid in assembly. The elevator cabin is fastened to the slide so as to be secured against slippage by means of a quarter-turn fastener or an eccentric lever or a screw connection between the elevator cabin and slide.

The fundamental idea of the invention is based on the thought that the particular conditions for elevator systems in air travel and space travel, namely, guaranteeing unconditional protection against negative accelerations and uncontrolled movements of the elevator cabin in all conceivable movement sequences of the aerodynamic vehicle while simultaneously limiting volume and weight and reducing maintenance and noise, can only be met by departing from gearing types comprising toothed metal linear drives. The solution consists in that the cabin movement is carried out by means of a conveying belt drive which satisfies the necessary conditions in cooperation with an anti-slip device (toothed belt) and determined measuring and regulating devices (belt monitoring device and measuring device for detecting the rotor position). In addition, a suitable column construction (mast supported on pendulum bearings) is provided for vertical load suspension, which column construction, in particular, meets the requirements of compatibility with respect to twisting or torsion and other positional deviations (caused, e.g., by temperature variations) of the supporting structure of an aerodynamic vehicle and, besides the supporting function, also takes over the linear guidance of the cabin slide and the lateral support of the elevator system. Due to the fact that this type of drive is not dependent on gravitational force and due to the load-independent slide guide and the sliding guidance of the mast (sliding/pendulum bearing), application of the invention is not limited to aircraft and should be expressly understood as extending also to space vehicles.

In an elevator system for aircraft which is realized in the manner mentioned above, a low-noise, reliably operating transport of loads between different levels (decks) of an aerodynamic vehicle and dependable stopping in the charging and unloading positions are achieved with reduced weight and reduced maintenance.

DETAILED DESCRIPTION OF FIGURES

DETAILED DESCRIPTION OF THE INVENTION

Figure 1A:
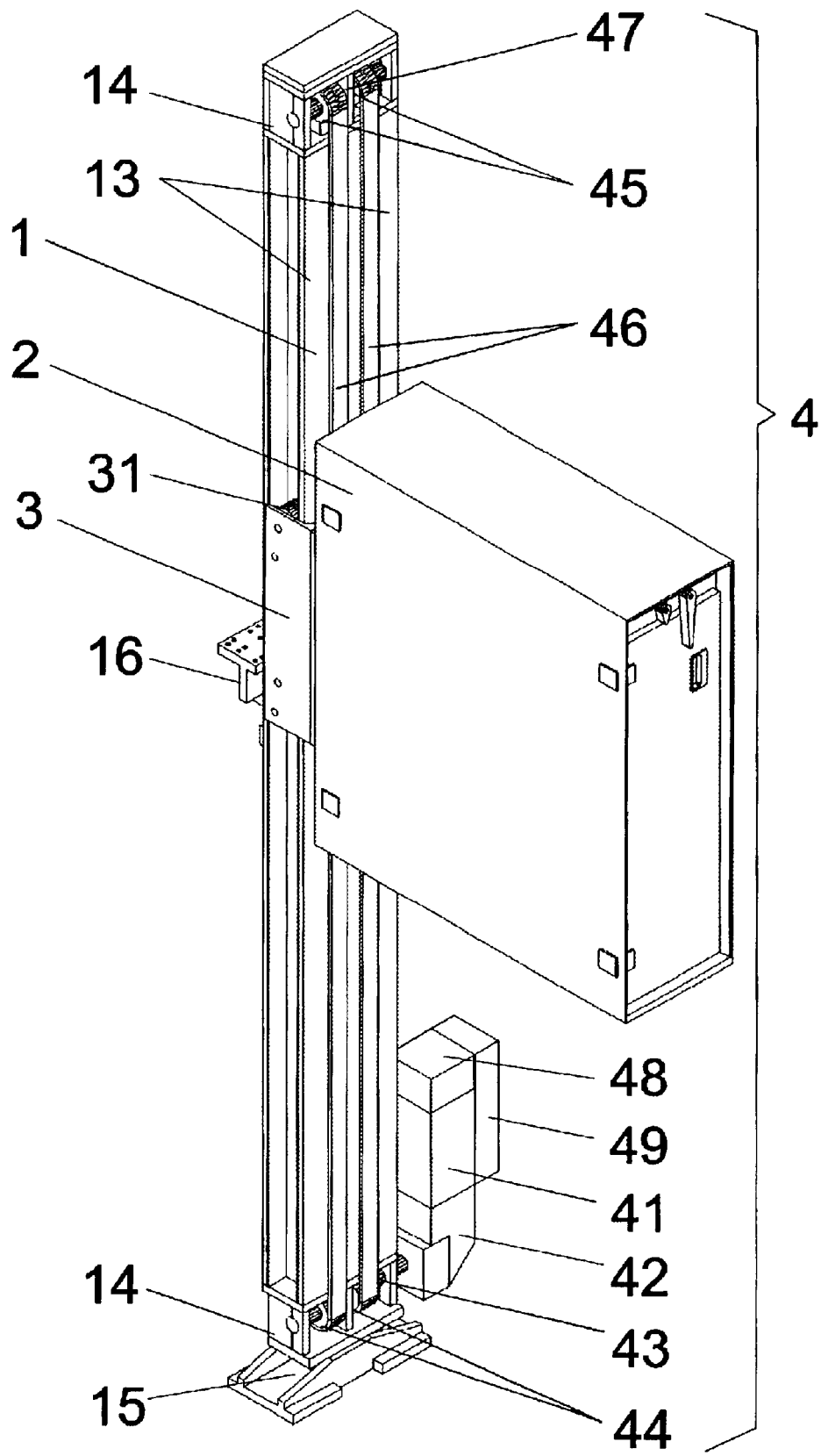
FIG. 1a shows a schematic view of the elevator system according to the invention.

In its basic construction, the elevator system according to the invention comprises as is shown in FIG. 1a separate from the surrounding components—a mast 1 which, besides the supporting function, also combines the functions of vertical driving and lateral guiding, an elevator cabin 2 for receiving material to be transported which is connected with the mast 1 so as to be vertically movable via a slide 3, and a drive system 4 comprising a drive motor 41, at least one drive belt 46 for converting the rotational movement of the drive motor 41 into a linear movement of the elevator cabin 2, wherein every drive belt 46 is guided over a drive roll 44 at the lower end of the mast 1 and a deflection roll 45 at the upper end of the mast. The drive system 4 is controlled and monitored by a digital drive control unit 49.

Figure 1B:
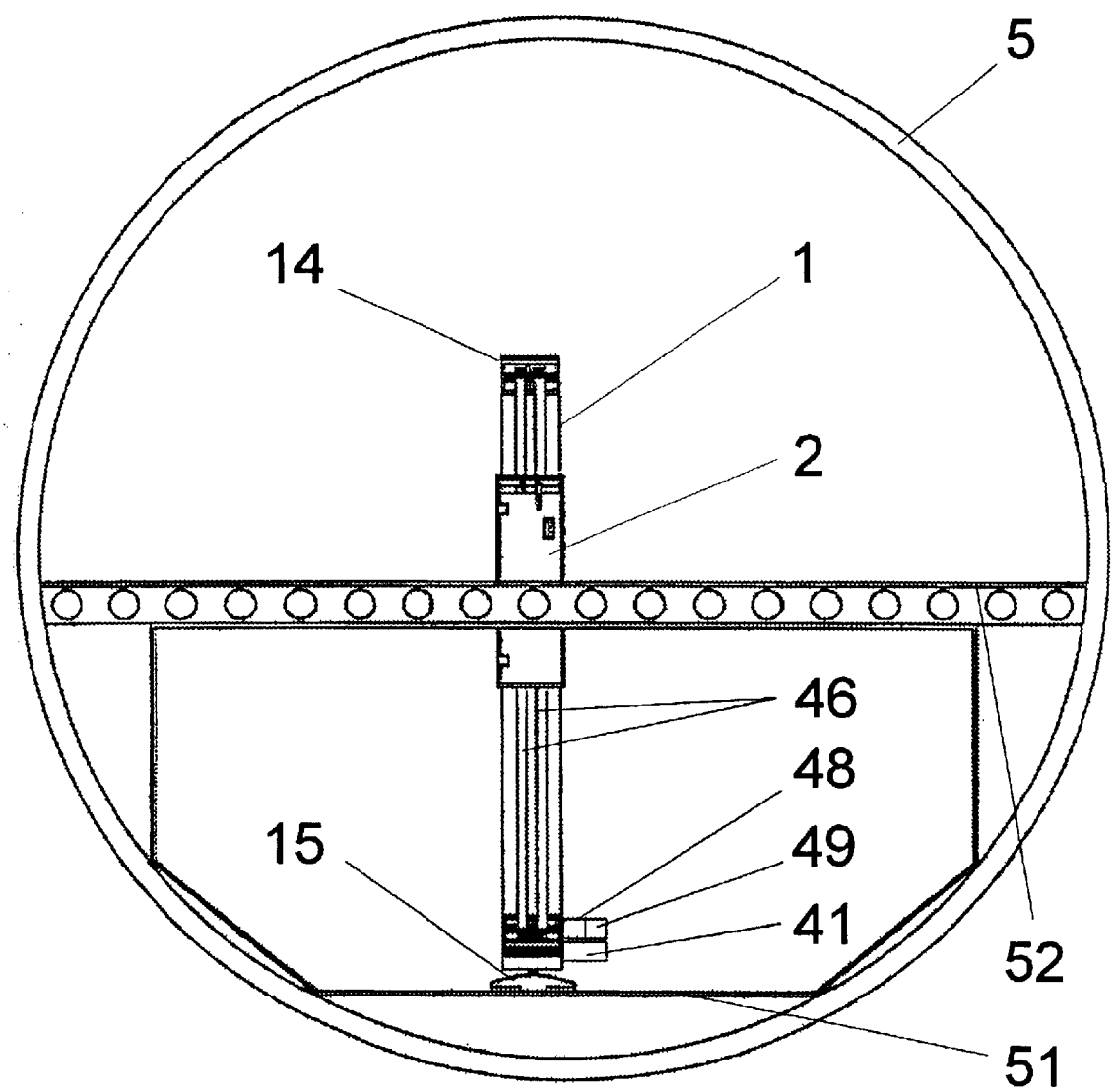
FIG. 1b shows a full view of the elevator system in an airplane (cross section)

FIG. 1b shows the elevator system according to FIG. 1a in its preferred installed position in an airplane. The airplane is shown schematically by a cross section through its fuselage 5 and has a lower deck 51 and an upper deck 52. Reference is had to the following description for FIG. 1a with respect to the details of the elevator system since these details are shown more clearly.

Although the elevator system according to the invention is always described in the following in relation to aircraft, especially airplanes, and the transported material is referred to as a load, the elevator system is also suitable for applications in space travel because of its special gravity-independent drive system and its slide guidance which is free from play and not dependent on load, and is expressly not limited to aircraft.

FIG. 1 shows an elevator system which is designed specifically for an airplane and which has two drive belts 46. The belts 46 are guided at the upper end of the mast 1 by the upper deflection rolls 45 which revolve in an end module 14 of the mast 1 on two separate shafts. At the bottom end of the mast, the drive rolls 44 are likewise guided in an end module 14, but are mounted on a common drive shaft 43 of the drive system 4. The drive shaft 43 is driven by the drive motor 41 via a step-down gear unit 42 in order to generate the required torque for moving, braking and holding the load and inherent load of the elevator cabin 2. The drive motor 41 is advisably guided at an AC converter as a brushless DC servo motor. Based on measurements of a measuring device 48 for detecting the rotor position, the AC converter in the drive control unit 49 regulates the current of the drive motor 41, determines the exact position of the elevator cabin 2 and moves specifically to a predetermined elevator position.

Figure 2:
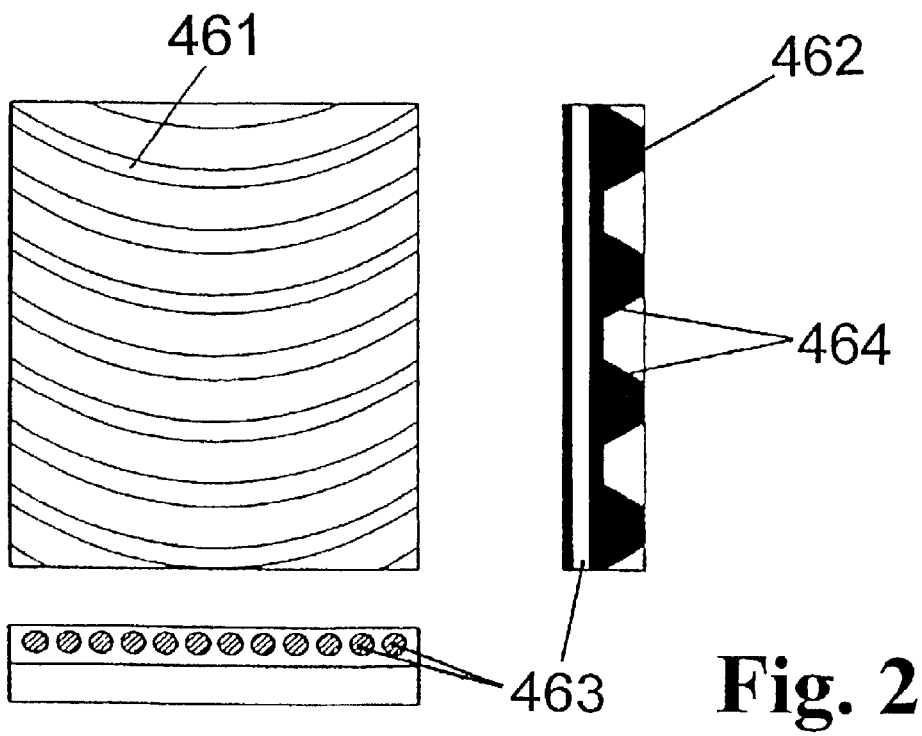
FIG. 2 shows an advantageous embodiment form of the drive belts.
Figure 11:
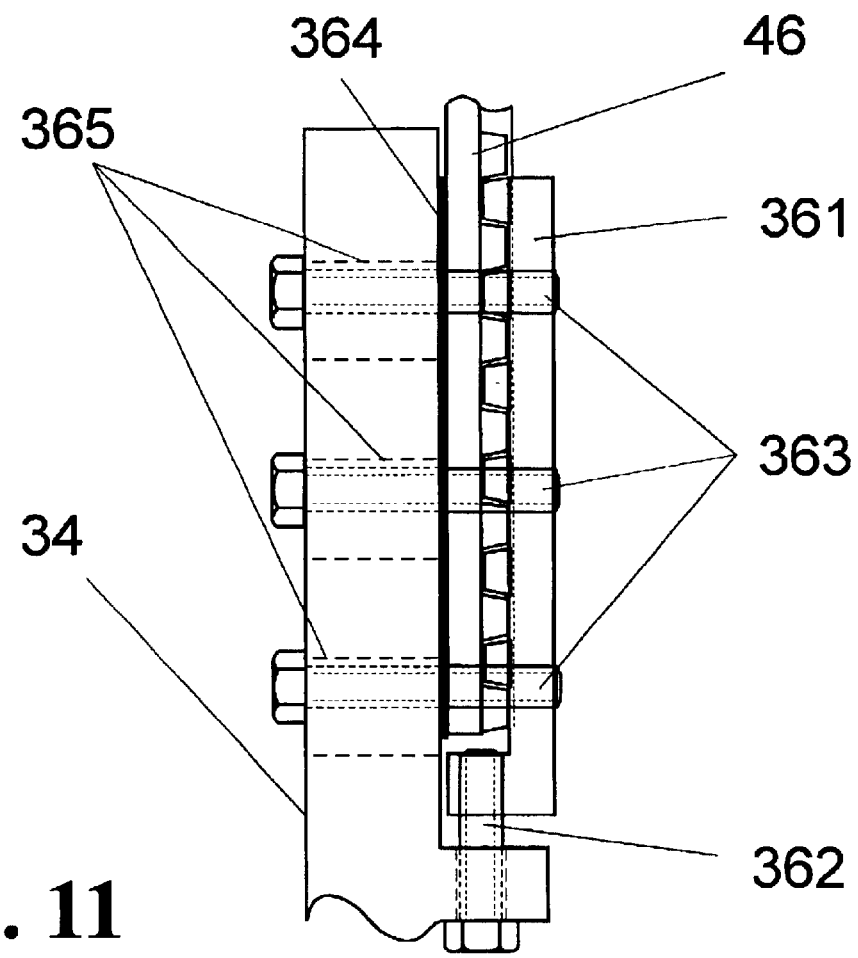
FIG. 11 shows a side view of the belt tensioning device.

In order to ensure vibrationless movement of the elevator cabin 2 and transfer of force from the drive motor 41 to the elevator cabin 2 which is always secure and free from slippage, a slide 3 is provided at the mast 1 for reliable guidance of the cabin. The drive belts 46 are pretensioned at this slide 3 by means of a tensioning device 36 (shown in more detail in FIGS. 9 and 11). In addition, the drive belts 46 are provided with teeth and the drive rolls 44 and deflection rolls 45 have a corresponding toothing. This toothing is advisably constructed in such a way that there is simultaneously also a lateral guiding of the belts 46 on the drive rolls 44 and deflection rolls 45. For this purpose, a possible arrangement of the tooth pattern as a spiral toothing 461 is shown in a top view on the left-hand side of FIG. 2. The lower view of FIG. 2 shows the cross section of a drive belt 46 which has highly stretch-resistant strand inlays 463 in the base material 462 in the form of steel wires or carbon fibers in the longitudinal direction of the belt 46. In addition, the view at right shows a longitudinal section of the drive belt 46 to illustrate that the base material 462, which is preferably made of polyurethane (or a similarly ductile plastic) and in which the strand inlays 463 are embedded, is provided at the tooth flanks with a more wear-resistant layer 464 made, for example, from polyamide.

Figure 7:
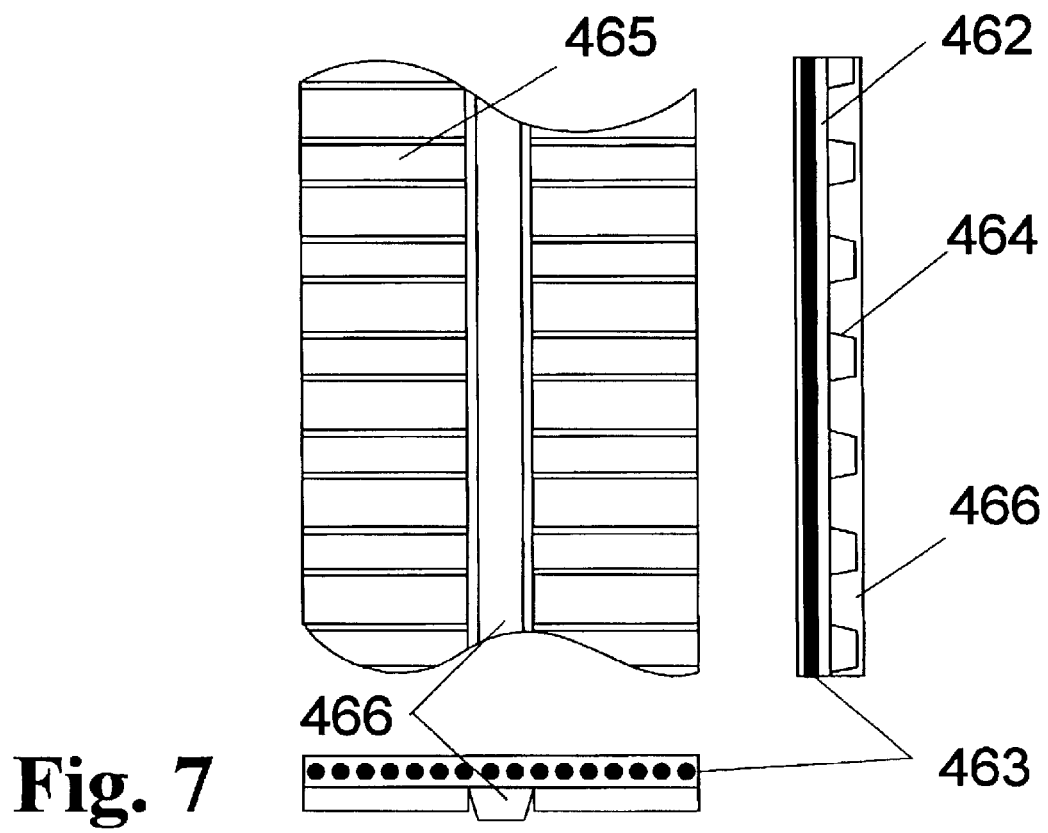
FIG. 7 shows another advantageous design of the drive belt.

With the same basic construction of the belt 46, FIG. 7 shows another advisable toothing pattern of the belt 46 in that, in addition to a spur toothing 465, a circulating spline 466 is arranged in the center of the belt. However, a plurality of circulating splines 466 can also be provided if permitted by the width of the belt.

The slide 3 is fastened to the freely accessible portions of the drive belts 46 at the mast 1 (externally) and is supported by these freely accessible portions, so that the belts 46 receive the entire inherent load and payload of the elevator cabin 2 and transfer them to the mast 1 via the upper deflection rolls 45. In this connection, the full load is supported on the upper end module 14 of the mast 1 in that the deflection rolls 45 and a belt monitoring device 47 are located on separate shafts and is transferred to the drive shaft 43 via the portion of the drive belts 46 (return or idle portion) running back to the drive rolls 44. The belt monitoring device 47 is used primarily for monitoring a defined pretensioning of the belts 46, but also serves as a safety device in cases of breakdown (e.g., tears in belt, thinning out of belt, etc.).

Figure 9:
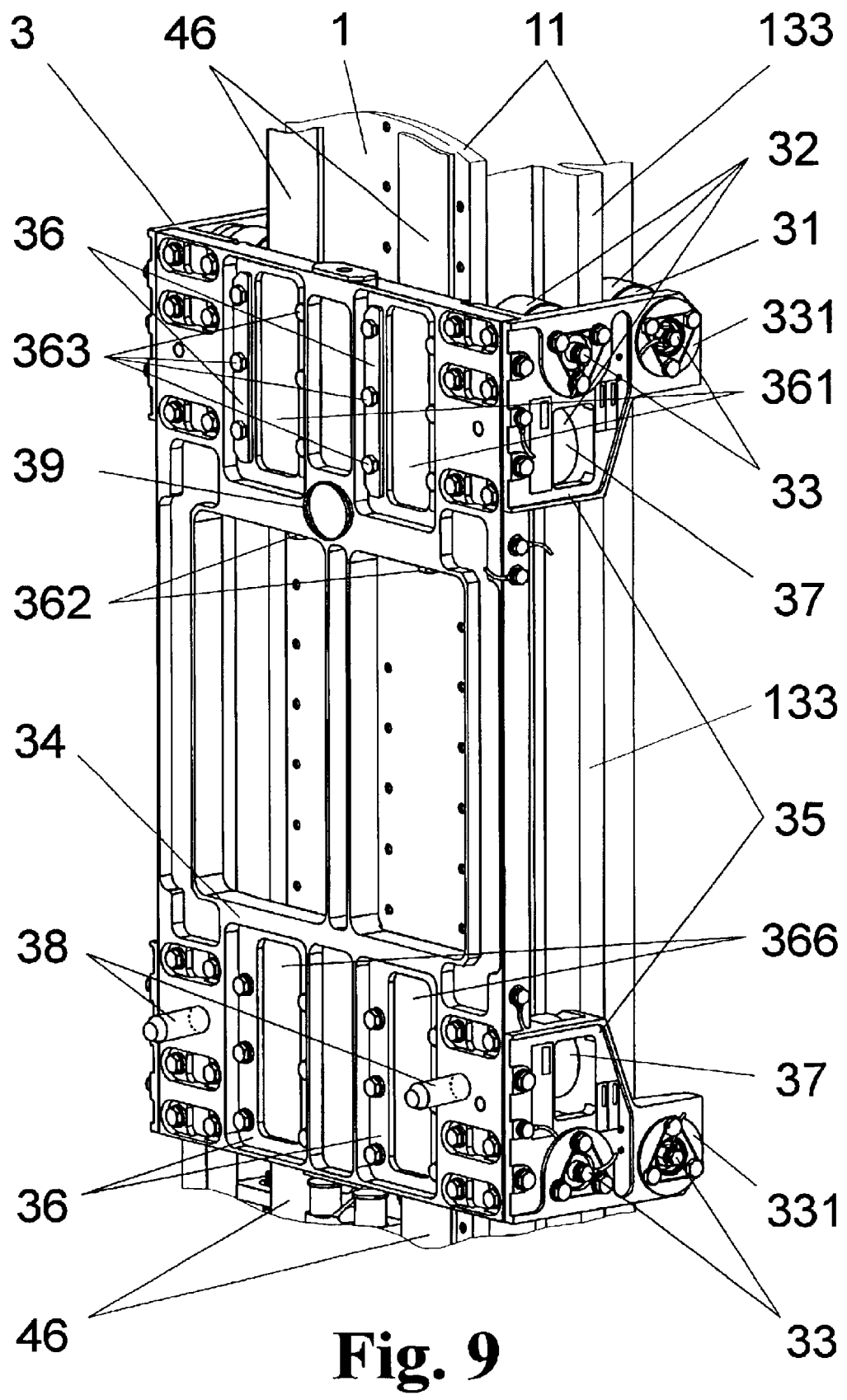
FIG. 9 shows another advantageous construction of the slide at a mast according to FIG. 8.

FIG. 9 shows the suitable pretensioning of the belts 46. At the inner surface of the slide 3 located opposite the mounting surface 34 of the slide 3 and facing the mast 1, the ends of the two belts 46 are fastened in each instance by means of a tensioning device 36 which is fastened by screws proceeding from the mounting surface 34. The tensioning devices 36 shown at the bottom of slide 3 in FIG. 9 are outfitted with fixed tensioning plates 366, while the upper tensioning devices 36 are arranged so as to be displaceable vertically. In exactly the same manner as the movable tensioning plate 361 shown in profile in FIG. 11, every fixed tensioning plate 366 is provided with a negative toothing adapted to the toothing pattern of the belt 46 which, by means of a screw connection through the mounting surface 34, results in that the ends of the belts 46 guided by the drive rolls 44 are fastened in a positive and frictional engagement at the slide 3.

The ends of the belts 46 guided over the deflection rolls 45 to the slide 3 are fastened by a movable tensioning plate 361 and can therefore be tightened at the slide 3. For this purpose, it is provided according to FIG. 11 that the tensioning plate 361 can tighten the belt 46 by means of a tensioning screw 362 fastened to the slide when the locking screw 363 is loosened.

Also, to ensure that the belts 46 can be retightened without difficulty after having already been fastened by the locking screws 363, there is a sliding plate 364 between the mounting plate 34 of the slide 3 and the belt 46 which enables a displacement of the tensioning plate 361 with the locking screws 363 screwed into it, the end of the belt 46 which is fitted in by means of the toothing, and the sliding plate 364. By turning the tensioning screw 362 when the locking screws 363 are loosened, the tensioning plate 361 together with the sliding plate 364, the belt 46 and the locking screws 363 is displaced linearly in elongated holes 365 in the mounting plate 34 of the slide 3 and the belt 46 is accordingly tensioned downward. Finally, the movable tensioning plates 361 are fastened again by means of the locking screws 363. The tensioning process can be repeated any time the belt monitoring device 47 detects an insufficient state of tension in the belt 46 and has not yet detected a tear.

Figure 3:
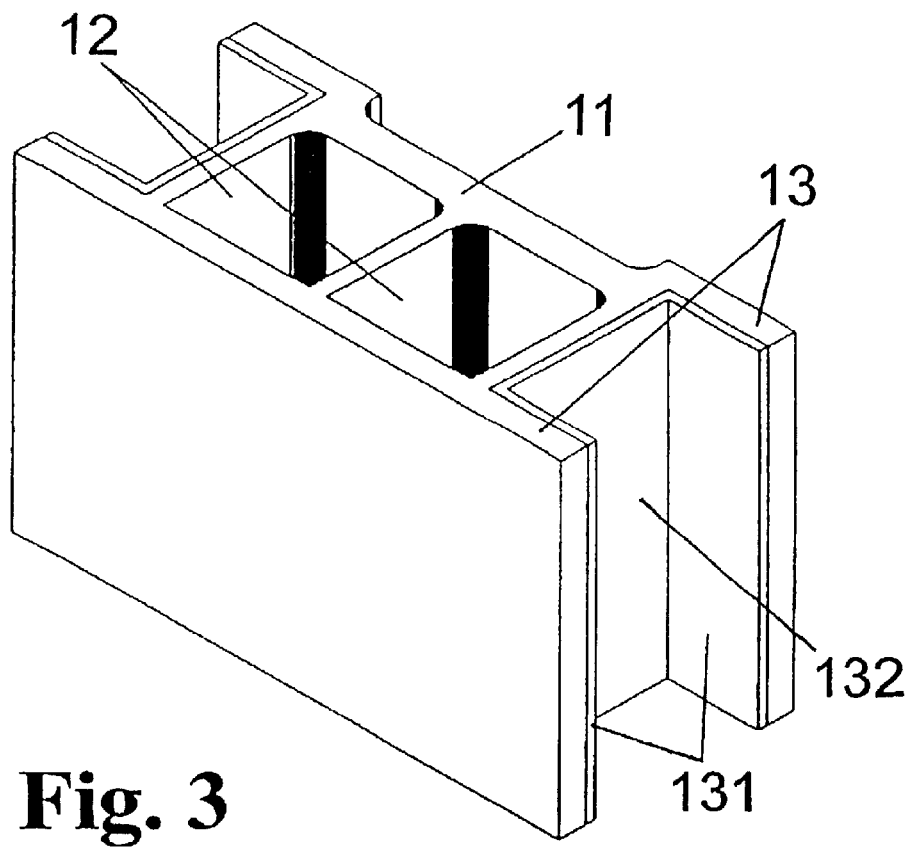
FIG. 3 shows a preferred design of the mast section.

FIG. 3 shows the mast 1 in cross section. The supporting function is realized by a torsion-resistant hollow section 11. The hollow section 11 has a quantity of vertical, preferably rectangular, channels 12 corresponding to the number of drive belts 46 for the elevator system. In this example, there are two channels 12, each channel 12 receiving the return (idle portion) of a drive belt 46 between the deflection roll 45 and the drive roll 44. There are guide rails 13 at the lateral flanks of the mast 1 for receiving the guide rollers 31 of the slide 3 in the form of U-sections, the channels 12 of the hollow section 11 of the mast 1 being located between the oppositely oriented guide rails 13.

With respect to function, the mast 1 is conceived in such a way that the entire inherent load and payload of the elevator system is absorbed by the lower end of the mast in a pendulum bearing 15 and the lateral (horizontal) forces are intercepted by an upper mast fastening in the form of a pendulum sliding bearing 16. The lower pendulum bearing 15 can be constructed in the manner of a spherical head bearing which is integrated in a base element that is shown schematically in FIG. 1.

Figure 4:
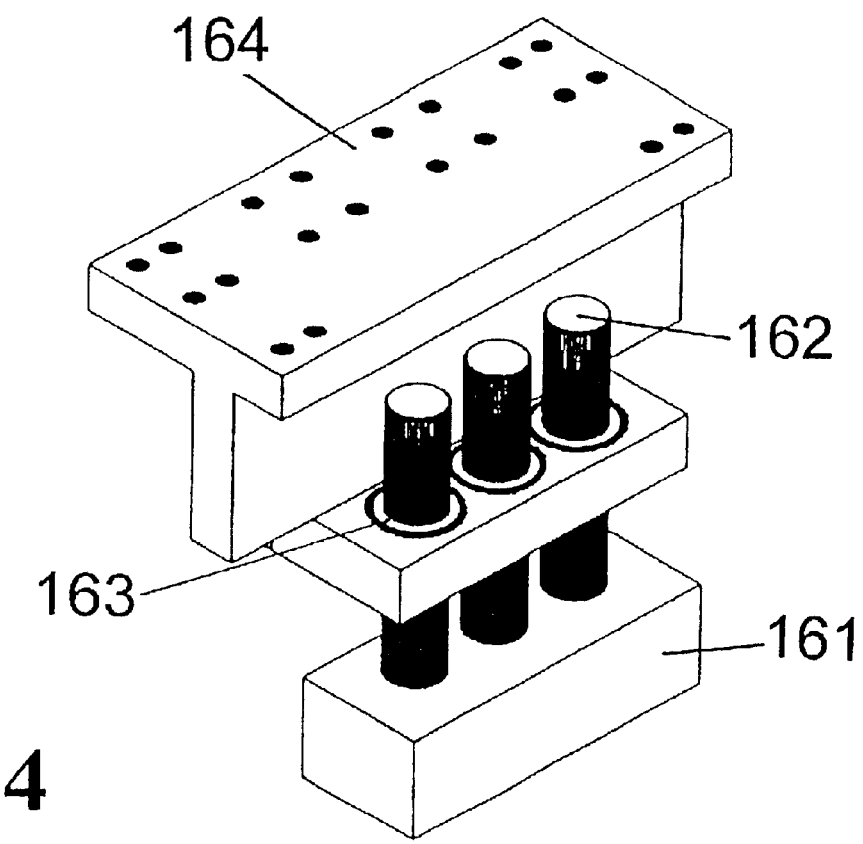
FIG. 4 shows an advantageous construction of the pendulum sliding bearing as upper mast fastening.

The upper sliding pendulum bearing 16 is shown in a magnified view in FIG. 4. A plurality of sliding pins 162 (preferably three) are rigidly fastened parallel to the mast direction in a connection plate 161 arranged orthogonally at the mast 1. Another connection element 164 with a plate oriented orthogonal to the sliding pins 162 is arranged at the supporting structure of the airplane (e.g., at the floor of an upper deck of the airplane), wherein self-aligning sliding bearing bushings 163 are recessed into the plate, their quantity and size being adapted to the sliding pins 162. The sliding bearing bushings 163 are embedded in elastic material (e.g., rubber), so that they are capable of compensating for a vertical displacement of the connection plate 161 relative to the connection element 164 supported by the airplane structure as well as a lateral deviation of the mast 1 (tilting by a few degrees).

Figure 5:
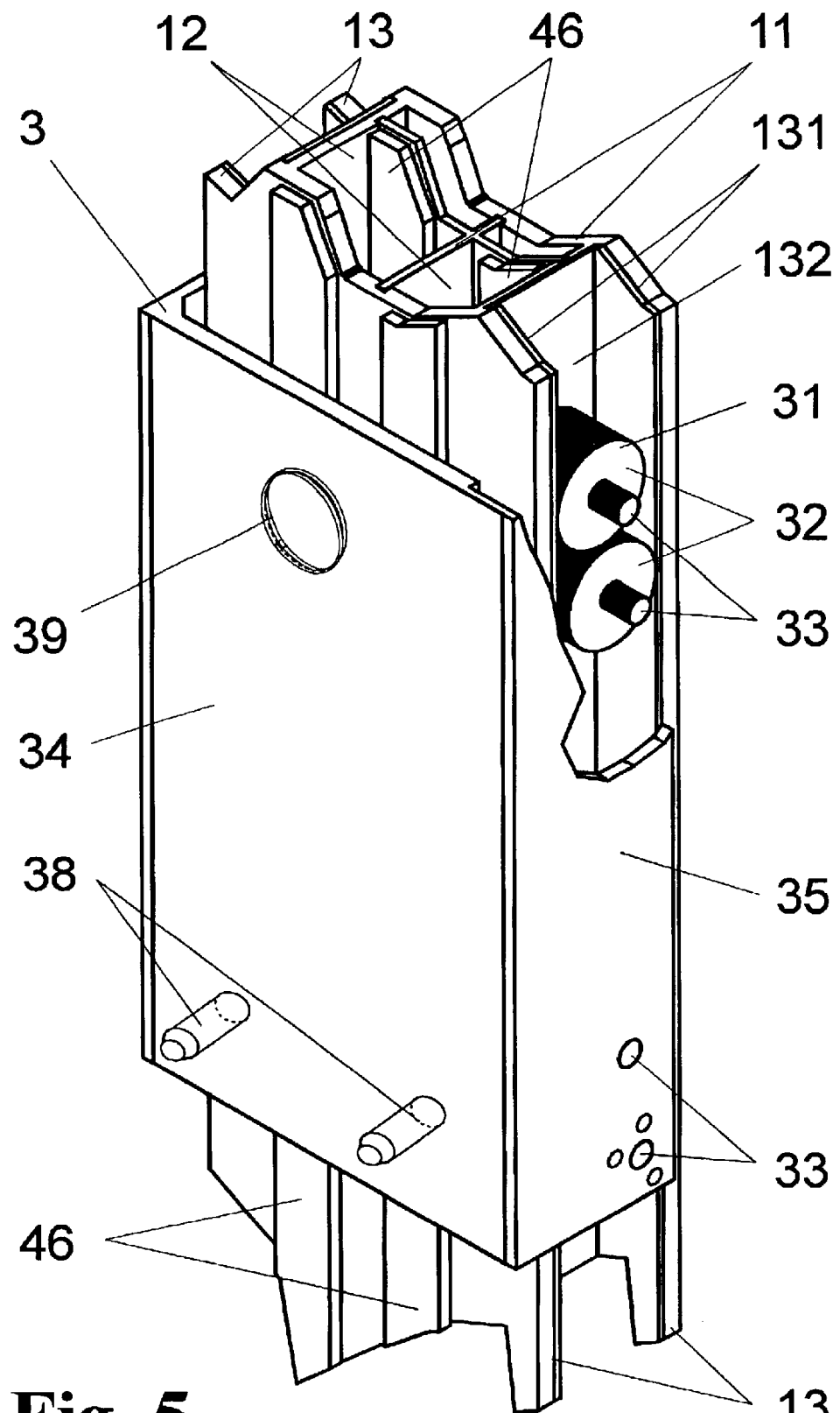
FIG. 5 shows an advisable arrangement of the slide guide at the mast.

Referring to FIG. 5, it will be shown how the slide 3 is guided without play at the mast 1 with guide rails 13 as U-sections, as was described in the example according to FIG. 3. Fitting therein, the slide 3 has the shape of a wide U-section penetrated by the mast 1. Two pairs 32 of guide rollers 31 are arranged at the inner side of the sides or legs 35 of the slide 3 in such a way that they engage in the opposing U-sections of the guide rails 13.

The guide rollers 31 for the upward movement and downward movement of the elevator cabin 2 are arranged at the slide 3 in such a way that the two guide rollers 31 of a pair 32 roll respectively along different U-section legs 131 of the mast 1 as can be seen in the broken-away view of part of the slide 3. The guide rollers 31 of a pair 32 are arranged closely adjacent to one another on shafts 33 so as to be offset relative to one another in the direction of the mast I (transporting direction). There are at least two such pairs 32 of guide rollers 31 in each U-shaped guide rail 13 for stable guidance of the slide 3 at the mast 1 as will be seen in the lower part of the visible leg 35 of the slide 3 from the indicated shafts 33.

Figure 6:
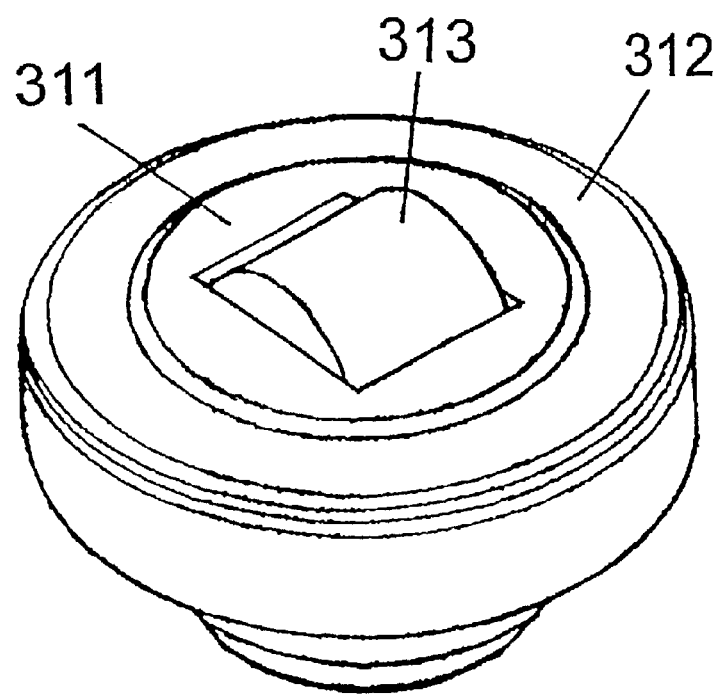
FIG. 6 shows a preferred embodiment form of the guide rollers of the slide with integrated transverse guide roller at the U-section base of the mast.

In order to guide the slide 3 also in the direction of the oppositely oriented guide rails 13 of the mast 1 without play, additional rollers are provided which roll on the U-section base 132. In this example, as will be seen from FIG. 6 for a guide roller 31, the guide rollers 31 themselves are constructed as two-roller systems for this purpose. Each guide roller 31 comprises a non-rotating central part 311 in which a small transverse guide roller 313 is embedded and an externally revolving main guide roller 312. The slide 3 is accordingly guided and supported without play in its movement direction laterally (i.e., in both orthogonal directions of the horizontal plane).

The large-surface front side of the slide 3 is the mounting surface 34 for the elevator cabin 2 to which the elevator cabin 2 is fastened proceeding from the interior of the elevator cabin by means of a quick-closure, preferably two pins 38 at the mounting surface 34 and by means of a quarter-turn fastener which is indicated in FIG. 5 by its locking ring 39. Alternatively, it is also possible to fasten the cabin 2 to the slide 3 by screwing or by an eccentric lever, so that higher forces can be transferred. The pins 38 are provided in all cases for simplifying assembly and for receiving all vertical force components.

Figure 10:
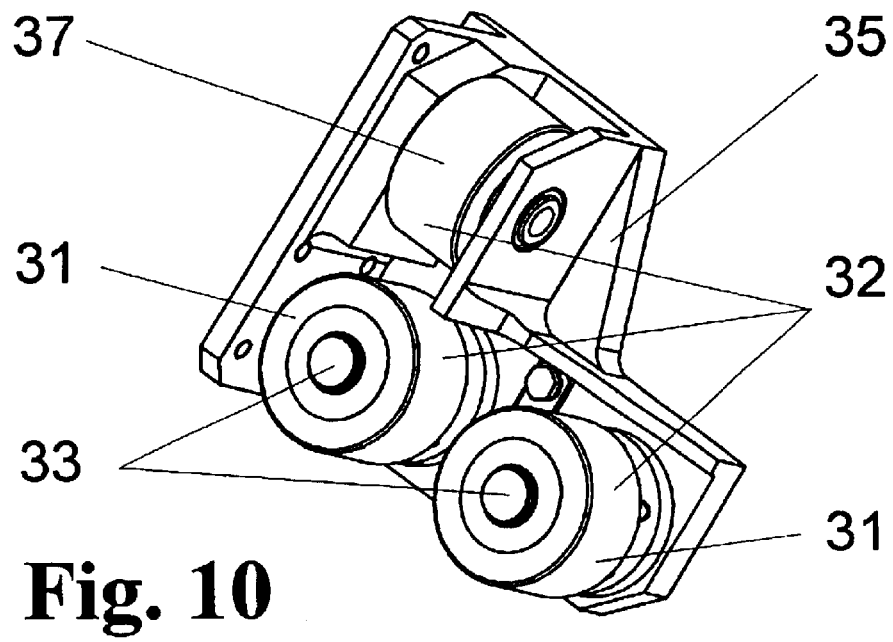
FIG. 10 shows an advisable structural shape of a side in a slide according to FIG. 9.

Another embodiment example for the design of the entire elevator system is described in the following with reference to FIGS. 8 to 10. The possible belt designs according to FIGS. 2 and 7 can still be applied in the same manner. Also, the pendulum bearing 15 still serves as lower mast fastening and the sliding pendulum bearing 16 still serves as upper mast fastening as has already been described.

Figure 8:
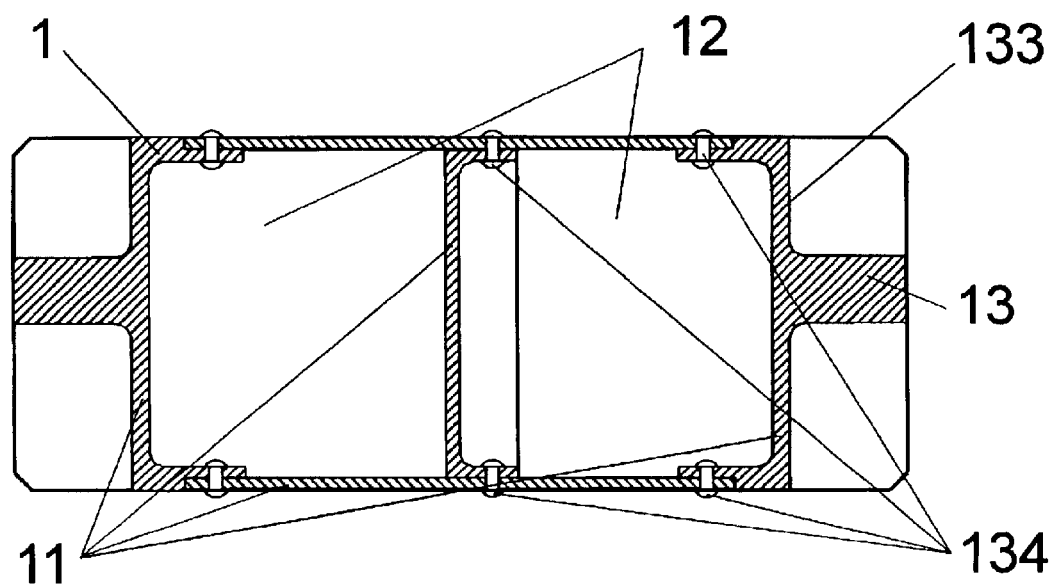
FIG. 8 shows another embodiment form of the mast with T-section guide rails.

In this example, the mast 1—as can be seen in FIG. 8—has the same basic structure as in FIG. 3, characterized by an overall structure in the shape of a load-bearing hollow section 11 and by two channels 12. In this case, in contrast to FIG. 3, the mast 1 comprises individual rolled sections which are preferably riveted and has guide rails 13 with a T-section. As is shown in FIG. 9, this T-section of the guide rails 13 is embraced by guide rollers 31 in pairs 32, two of which are again provided for each side 35 of the slide 3.

Contrary to FIG. 5, the slide 3 is designed so as to be substantially reduced in weight and, for this reason, has many openings and individual sides 35 for each of the two guide roller pairs 32. Each of these sides 35 contains a separate transverse guide roller 37 for transverse stabilization of the slide 3 at the mast 1, which makes possible the compact structural shape of the slides 35 shown in FIG. 10 and enables the use of identical standard rollers for parallel and transverse guidance of the slide 3.

The guide rollers 31 roll on opposite surfaces of the T-section rail 133 and are located exactly opposite one another. The guide rollers 31 located on the right-hand side at the visible side 35 referring to FIG. 9 are provided with an eccentrically mounted rotational shaft 33 so that the slide 3 is guided at the mast 1 without play. This eccentric shaft bearing 331 has the advantage that every pair 32 of guide rollers can be changed and screwed at a distance from one another in such a way that they are adjusted without play relative to the T-section rail 133. The same eccentric bearing support of the shafts 33 is also similarly useful for the guide roller pairs 32 in FIG. 5.

Figure 12:
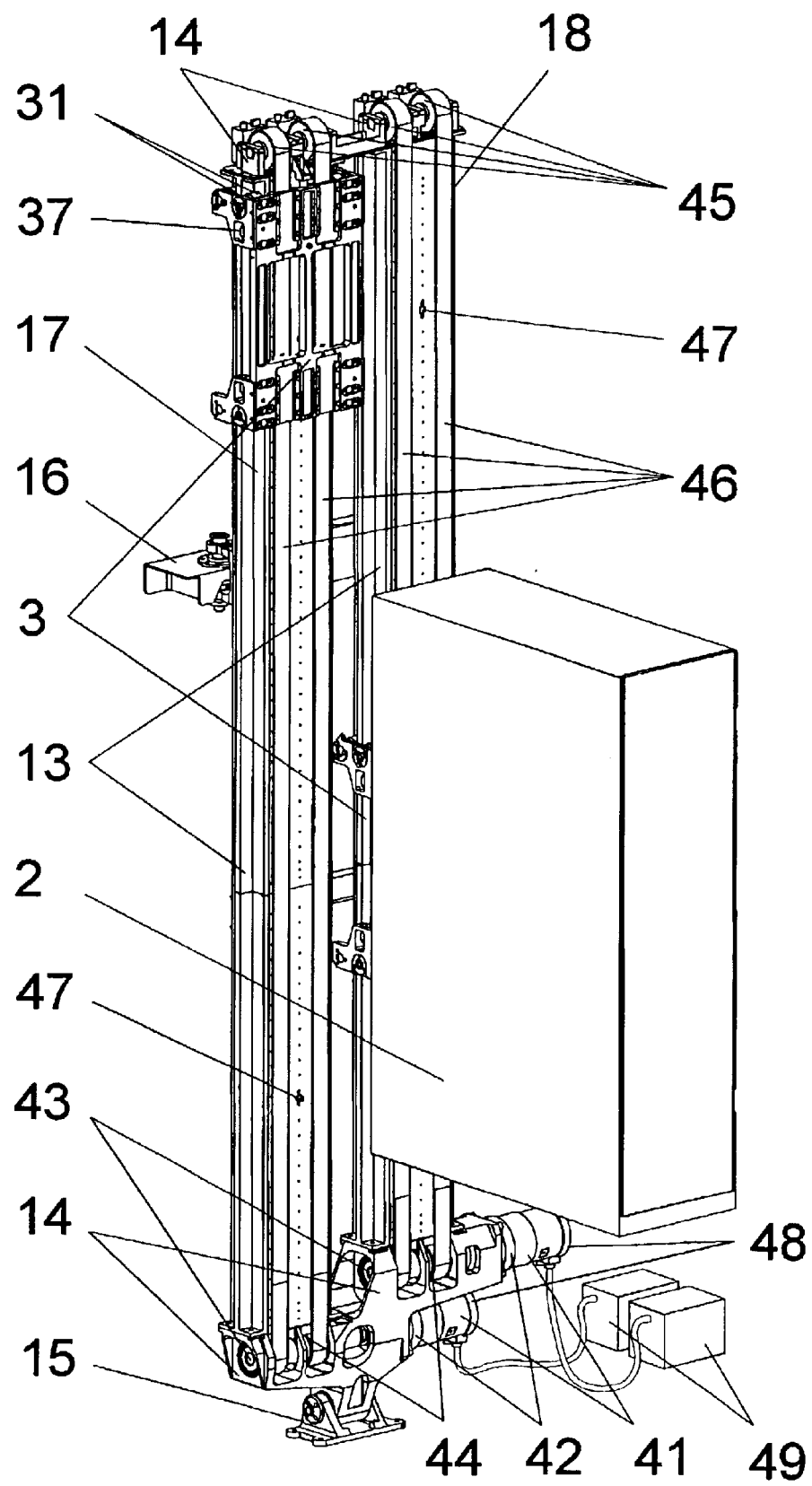
FIG. 12 shows an advantageous construction of the invention as a double-elevator system for airplanes.

For purposes of transporting passengers from a lower deck 51 to an upper deck 52 (passenger deck) and refuse and used tableware back to the lower deck 52 in a parallel manner, it is useful particularly in large passenger airplanes to be able to operate the two processes of personal transport and waste disposal in parallel. In this connection, FIG. 12 shows a design of the invention as a double elevator system. This double elevator system is particularly advantageous in that certain elements (particularly of the mast 1) can have a combined lighter construction than two separate elevator systems. As can be seen from FIG. 12, the mast construction has a hollow section 17 on the left and a hollow section 18 on the right; however, with respect to the bearing support, the pendulum bearing 15 as lower mast fastening and the sliding pendulum bearing 16 as upper mast fastening are thought of as a unit and merely have greater dimensions. Consequently, because the bearing support of both elevators is combined, the upper and lower end modules 14 are also rigidly connected to one another.

The drive motors 41 have separate drive shafts 43, so that all other components of the drive system 14 must be provided in duplicate. For a clearer view of the entire system, the elevator cabin 2 is shown suspended from the left-hand hollow section 17, which is constructed exactly like the right-hand hollow section 18 corresponding to the view in FIG. 8; thus the slide 3 is shown once again in its arrangement according to FIG. 9.

Another feature contrasting with the previous examples is the multiple arrangement of belt monitoring devices 47 which are arranged in the vicinity of the drive rolls 44 and deflection rolls 45 for each hollow section 17 and 18.

The hollow sections 17 and 18 differ exclusively in their length so as to achieve in the lower end module 14 a parallel installation position, vertically one above the other, of the drive motors 41 with the associated step-down gear units 42 and the measuring devices for measurement 48 of the rotor position along the respective drive shaft 43. In this example (because of space restrictions existing in the airplane), the drive control units 49 are not positioned directly at the drive motor 41, but rather are accommodated in separate boxes by means of connecting cable without changing the motor control in this way.

All of the rest of the functions and arrangements of the double elevator system are constructed in accordance with the previous examples. Reference is had in particular to the descriptions relating to FIGS. 7 to 11.

What is claimed is:

1. An elevator system for vertical transportation of loads in an aircraft, comprising:

an elevator cabin;

a mast for guiding the elevator cabin between different horizontal levels;

said mast having a strong connection with a high length to diameter ratio formed of hollow sections and guide rails and having a lower mast fastening for deliberately transferring all of the weight into a ground supporting structure of the aircraft and an upper mast fastening for transferring all horizontal forces of the mast into a supporting structure of the aircraft which is situated higher, wherein the lower mast fastening is fixing the mast vertically in such a manner, that the mast is movable pendulously around the lower mast fastening in longitudinal and transversal axes of the aircraft, and wherein the upper mast fastening is fixing the mast in the longitudinal and transversal axes of the aircraft but does not offer resistance in opposite to movements of the higher supporting structure relative to the lower mast fastening;

a drive system having a drive motor with a large torque and able to be well regulated and at least one closed belt for transferring the torque of the drive motor to the elevator cabin and for transferring all of the weight of the elevator cabin to the mast;

said belt being guided at the lower end and the upper end of the mast on a drive roll and a deflection roll and being pretensioned in a defined manner;

said belt being provided with teeth which are adapted to a toothing of the drive and deflection rolls and having between the drive roll and the deflection roll a freely accessible belt portion oriented parallel to the mast for fastening the elevator cabin and for moving the elevator cabin along the mast.

2. Elevator system according to claim 1, characterized in that the toothing of the belt and drive roll and deflection roll has a lateral guide in addition.

3. Elevator system according to claim 2, characterized in that the belt has a spiral toothing.

4. Elevator system according to claim 2, characterized in that the belt has a spur toothing and a circulating spline.

5. Elevator system according to claim 1, characterized in that the belt is formed of a base material of ductile plastic and longitudinally oriented strand inlays.

6. Elevator system according to claim 5, characterized in that the base material of the belt comprises polyurethane.

7. Elevator system according to claim 5, characterized in that steel wires are inserted in the base material of the belt.

8. Elevator system according to claim 5, characterized in that carbon fibers are inserted in the base material of the belt.

9. Elevator system according to claim 6, characterized in that the toothing of the belt has a more wear-resistant layer, preferably polyamide, at the tooth flanks.

10. Elevator system according to claim 1, characterized in that a plurality of belts are provided for transferring load from the elevator cabin to the mast in order to increase reliability and safety, wherein the drive rolls of the belts which are guided next to one another are arranged on a common drive shaft and the deflection rolls are arranged on separate shafts at the ends of the mast.

11. Elevator system according to claim 1, characterized in that a belt monitoring device for monitoring belt tension and belt damage is mounted at the upper end of the mast, wherein damage to the belt during load transport causes the drive motor to be shut off and the belt pretensioning can be checked and adjusted during idling.

12. Elevator system according to claim 1, characterized in that a tensioning device is provided for the belts, wherein the tensioning device is arranged in an area of the freely accessible belt portion that is concealed by the elevator cabin, so that the belt can be readjusted by applying defined pretensioning for extensive suppression of vertical vibrations.

13. Elevator system according to claim 12, characterized in that the tensioning device has tensioning plates which are screwed to the back of the elevator cabin, wherein there is a fixed tensioning plate for fixing a first end of the belt and a movable tensioning plate with tensioning screws for tensioning and fixing a second end of the belt.

14. Elevator system according to claim 1, characterized in that the drive motor has a measuring device for detecting rotor positions, wherein the position of the elevator cabin can be correlated to the rotor position of the drive motor by means of this measuring device via the toothing of the belts.

15. Elevator system according to claim 14, characterized in that the position of the elevator cabin relative to the floor of a respective deck of the aircraft is adjustable in a continuous manner by programming a drive control unit which is arranged downstream of the measuring device for detecting the rotor position.

16. Elevator system according to claim 15, characterized in that the drive motor is guided at an AC converter which, as part of the drive control unit, regulates the current of the drive motor, determines the exact position of the elevator cabin and moves toward a predetermined position in a deliberate manner based on the measurements of the rotor position.

17. Elevator system according to claim 1, characterized in that the drive motor is a brushless DC servo motor.

18. Elevator system according to claim 1, characterized in that a suitable step-down gear unit is provided for generating or holding a torque required for driving and braking the drive shaft.

19. Elevator system according to claim 1, characterized in that a mechanical brake device is provided at the drive shaft for stopping the elevator cabin in the currentless state of the drive motor in case of overload or breakdown.

20. Elevator system according to claim 1, characterized in that the mast has hollow sections with channels, wherein the channels, whose quantity and size are adapted to the quantity and dimensions of the belts, are provided for the return of the idle portions of the belts.

21. Elevator system according to claim 1, characterized in that the mast has end modules at the end of the hollow sections for receiving the deflection rolls.

22. Elevator system according to claim 1, characterized in that there is a pendulum bearing as lower mast fastening in a lower deck of the aircraft for load carrying, wherein it is ensured that the mast is movable in the longitudinal axis and transverse axis of the aircraft about this pendulum bearing.

23. Elevator system according to claim 1, characterized in that the mast has, as upper mast fastening at a higher deck of the aircraft, a sliding pendulum bearing which fixes the mast in the longitudinal axis and transverse axis of the aircraft but does not offer resistance to the movements of the upper deck relative to the lower mast fastening.

24. Elevator system according to claim 1, characterized in that stiffening or reinforcement is provided in the supporting structure of the aircraft for receiving the load of the entire elevator system only in the region of the lower mast fastening.

25. Elevator system according to claim 1, characterized in that the mast has, at the sides in transverse direction to the side on which the elevator cabin is arranged, a guide rail for guiding the elevator cabin along the mast.

26. Elevator system according to claim 25, characterized in that the guide rails are two U-sections which are located opposite one another.

27. Elevator system according to claim 25, characterized in that the guide rails are two T-section rails which are located opposite one another.

28. Elevator system according to claim 25, characterized in that a plurality of groups of guide rollers are provided for guiding the elevator cabin along each side of the mast, wherein the guide rollers of a group roll on different surfaces of the respective guide rail of the mast closely adjacent to one another.

29. Elevator system according to claim 28, characterized in that the guide rollers are grouped in pairs for guiding longitudinally, wherein at least two pairs roll on each guide rail.

30. Elevator system according to claim 28, characterized in that the different rolling surfaces of the guide rollers in a guide rail with U-section are the inner sides of the U-section legs.

31. Elevator system according to claim 30, characterized in that the guide rollers are constructed as two-roller systems, wherein they have a non-rotating central part about which the main guide roller revolves and at which a smaller transverse guide roller is embedded on the front side with respect to the main guide roller in such a way that the two-roller system rolls in a defined manner at a U-section leg and at the U-section base of the guide rail.

32. Elevator system according to claim 30, characterized in that the guide rollers of a pair rolling on opposite rolling surfaces of the guide rail are arranged so as to be offset relative to one another in the direction of the guide rail.

33. Elevator system according to claim 28, characterized in that the different rolling surfaces of the guide rollers in a guide rail with a T-section are the outer sides of the T-section rail.

34. Elevator system according to claim 33, characterized in that the guide rollers of a pair rolling on opposite rolling surfaces of the guide rail are arranged exactly opposite one another with respect to the guide rail.

35. Elevator system according to claim 33, characterized in that the group of guide rollers contains an equivalent transverse guide roller in addition to the pair of guide rollers rolling on opposite rolling surfaces of the guide rail.

36. Elevator system according to claim 28, characterized in that at least one guide roller of a pair is mounted on an eccentrically adjustable shaft for adjusting the guide rollers without play relative to the guide rail.

37. Elevator system according to claim 1, characterized in that a slide is provided between the mast and elevator cabin for coupling the elevator cabin to the freely accessible belt portion and for linear guidance along the mast, wherein the guide rollers for guiding the elevator cabin which act laterally on the mast are fastened to the slide, and there is a mounting surface for the rigid fastening of the elevator cabin.

38. Elevator system according to claim 37, characterized in that the slide has the shape of a wide U-section, wherein the mast is essentially embedded inside this U-shaped slide and the shafts of the guide rollers are oriented parallel to the mounting surface of the slide at the inner sides of the legs of the slide.

39. Elevator system according to claim 38, characterized in that the elevator cabin is fastened to the slide by means of a quick-closure to facilitate maintenance and exchange.

40. Elevator system according to claim 39, characterized in that there is at least one pin for load suspension of the elevator cabin and a quarter-turn fastener for securing the elevator cabin without slippage are provided at the slide.

41. Elevator system according to claim 34, characterized in that at least one pin for load suspension of the elevator cabin and an eccentric lever for securing the elevator cabin without slippage are provided at the slide.

* * * * *